(12) United States Patent
Glugla

(10) Patent No.: US 9,719,436 B2
(45) Date of Patent: Aug. 1, 2017

(54) METHOD FOR PRE-IGNITION CONTROL IN A PRE-DELIVERY PHASE

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 14/550,611

(22) Filed: Nov. 21, 2014

(65) Prior Publication Data

US 2016/0146126 A1 May 26, 2016

(51) Int. Cl.

| B60T 7/12 | (2006.01) |
|---|---|
| F02D 37/02 | (2006.01) |
| F02D 41/00 | (2006.01) |
| F02D 35/02 | (2006.01) |
| F01L 1/34 | (2006.01) |
| F02D 41/24 | (2006.01) |
| F02P 5/152 | (2006.01) |
| F02D 13/02 | (2006.01) |
| F02D 13/06 | (2006.01) |
| F02D 23/02 | (2006.01) |
| F02P 5/04 | (2006.01) |

(52) U.S. Cl.
CPC .............. *F02D 37/02* (2013.01); *F01L 1/34* (2013.01); *F02D 13/02* (2013.01); *F02D 13/06* (2013.01); *F02D 23/02* (2013.01); *F02D 35/027* (2013.01); *F02D 41/005* (2013.01); *F02D 41/0007* (2013.01); *F02D 41/2432* (2013.01); *F02P 5/1528* (2013.01); *F02D 41/008* (2013.01); *F02D 2041/001* (2013.01); *F02P 5/045* (2013.01); *Y02T 10/144* (2013.01); *Y02T 10/18* (2013.01); *Y02T 10/46* (2013.01); *Y02T 10/47* (2013.01)

(58) Field of Classification Search
CPC .............. F02B 19/1052; F02B 19/1085; F02D 2700/02; F02D 19/023
USPC .......... 701/101, 103–105, 112, 114; 123/434
See application file for complete search history.

(56) References Cited

U.S. PATENT DOCUMENTS

| 5,142,479 A | 8/1992 | Poirier et al. |
|---|---|---|
| 8,050,844 B2 | 11/2011 | Hoard et al. |
| 8,073,613 B2 | 12/2011 | Rollinger et al. |
| 8,132,556 B2 | 3/2012 | Glugla et al. |
| 8,136,614 B2 | 3/2012 | Andri |
| 8,260,530 B2 | 9/2012 | Rollinger et al. |
| 8,447,502 B2 | 5/2013 | Rollinger et al. |
| 8,463,533 B2 | 6/2013 | Glugla et al. |
| 8,683,976 B2 | 4/2014 | Cunningham et al. |

(Continued)

OTHER PUBLICATIONS

Glugla, Chris Paul, "Method for Pre-Ignition Control," U.S. Appl. No. 14/550,661, filed Nov. 21, 2014, 63 pages.

*Primary Examiner* — John Kwon
(74) *Attorney, Agent, or Firm* — Julia Voutyras; McCoy Russell LLP

(57) ABSTRACT

Various systems and methods are described for controlling spark plug fouling and pre-ignition in a newly manufactured vehicle. One method comprises, during a pre-delivery phase of the newly manufactured vehicle including an engine, operating the engine with a first setting for air/fuel ratio to reduce spark plug fouling, and adjusting the first setting of the air/fuel ratio responsive to pre-ignition.

9 Claims, 5 Drawing Sheets

(56) References Cited

U.S. PATENT DOCUMENTS

| | | |
|---|---|---|
| 8,694,186 B2 | 4/2014 | Syed et al. |
| 2010/0319644 A1* | 12/2010 | Choquette ............... F02P 3/005 |
| | | 123/169 R |
| 2011/0144882 A1* | 6/2011 | Bidner .................... F01M 1/08 |
| | | 701/102 |
| 2013/0139786 A1 | 6/2013 | Glugla et al. |

* cited by examiner

METHOD FOR PRE-IGNITION CONTROL IN A PRE-DELIVERY PHASE

TECHNICAL FIELD

The present application relates to controlling pre-ignition in an engine in a vehicle after production and before delivery.

BACKGROUND AND SUMMARY

Newly manufactured vehicles, after production, may be parked on a production plant parking lot before they are delivered to dealerships for sale. These vehicles may also be filled with low octane fuels and may be parked for longer durations at the production plant parking lot, and later, at a dealership lot before they are sold. As such, lower octane fuels can cause pre-ignition events during engine operation resulting in engine degradation. Pre-ignition events may also be triggered by aggressive driving such as driving that can occur when moving vehicles for short distances around production plant parking lots. In addition to pre-ignition, spark plugs in engines in the new vehicles may also be susceptible to degradation. As an example, spark plugs may experience fouling due to the presence of rich combustion conditions when engines are cold started. Further, as engine run times may be shorter when newly manufactured vehicles are moved around the production plant parking lot, carbon deposits on the spark plugs may not be burned off leading to fouling of the spark plugs. Thus, engine degradation in newly manufactured vehicles may occur due to pre-ignition as well as spark plug fouling.

The inventors herein have recognized the above issues and identified an approach to at least partly address the above issues. An example method may comprise, during a pre-delivery phase of a vehicle including an engine, operating the engine with a first setting for air/fuel ratio to reduce spark plug fouling, and adjusting the first setting of the air/fuel ratio responsive to pre-ignition. In this way, spark plug fouling and pre-ignition may be simultaneously controlled.

For example, a boosted engine in a newly manufactured vehicle may be operated with a pre-delivery calibration during a pre-delivery phase. The pre-delivery phase may include a phase between production and delivery to a dealership. In another example, the pre-delivery phase may include a mileage that is lower than a pre-determined threshold. The pre-delivery engine calibration may include a first setting for air/fuel ratio that is leaner than stoichiometry in order to reduce spark plug fouling. In response to indication of pre-ignition, the first setting for air-fuel ratio may be adjusted from leaner than stoichiometry to richer than stoichiometry. Further still, the air/fuel ratio may be re-adjusted to a leaner than stoichiometry ratio if spark plug fouling is detected. As such, engine conditions may be modified actively to control pre-ignition as well as spark plug fouling at the same time.

In this way, an engine in a newly manufactured vehicle may be controlled to diminish pre-ignition and spark plug fouling. By using a leaner than stoichiometric air/fuel ratio as the first setting in the pre-delivery calibration, rich combustion conditions during engine cold starts may be reduced leading to fewer deposits on the spark plug. In response to pre-ignition, the leaner than stoichiometric air/fuel ratio may be adjusted to a richer than stoichiometric air/fuel ratio. By enriching combustion in the engine, pre-ignition may be mitigated. Thus, engine operation may be controlled to decrease spark plug fouling and engine operation may be further adjusted to address pre-ignition. As a result, engine degradation in the pre-delivery phase due to pre-ignition and spark plug fouling may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
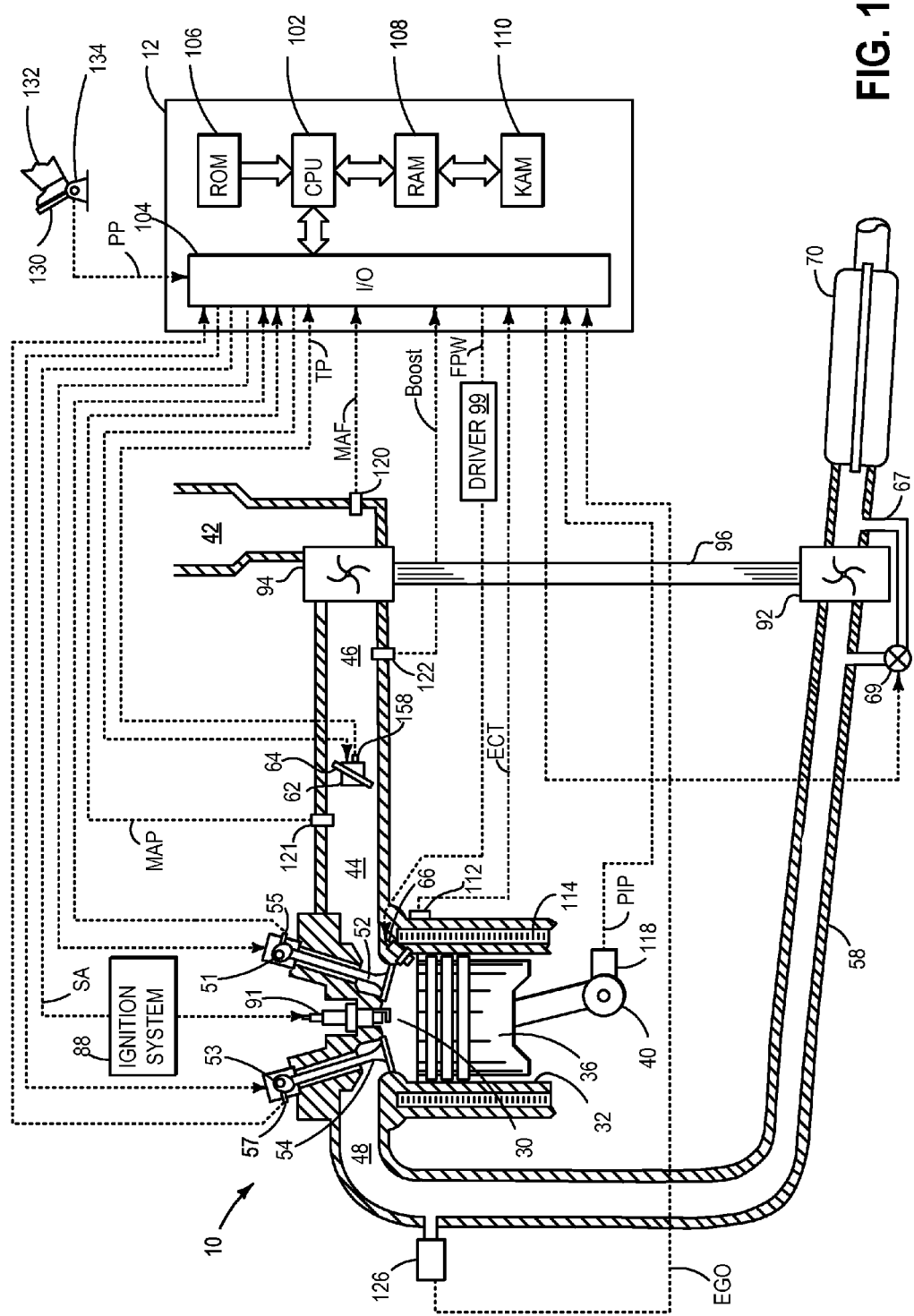
FIG. 1 shows a schematic diagram of an example combustion chamber in an engine in a vehicle.
Figure 2:
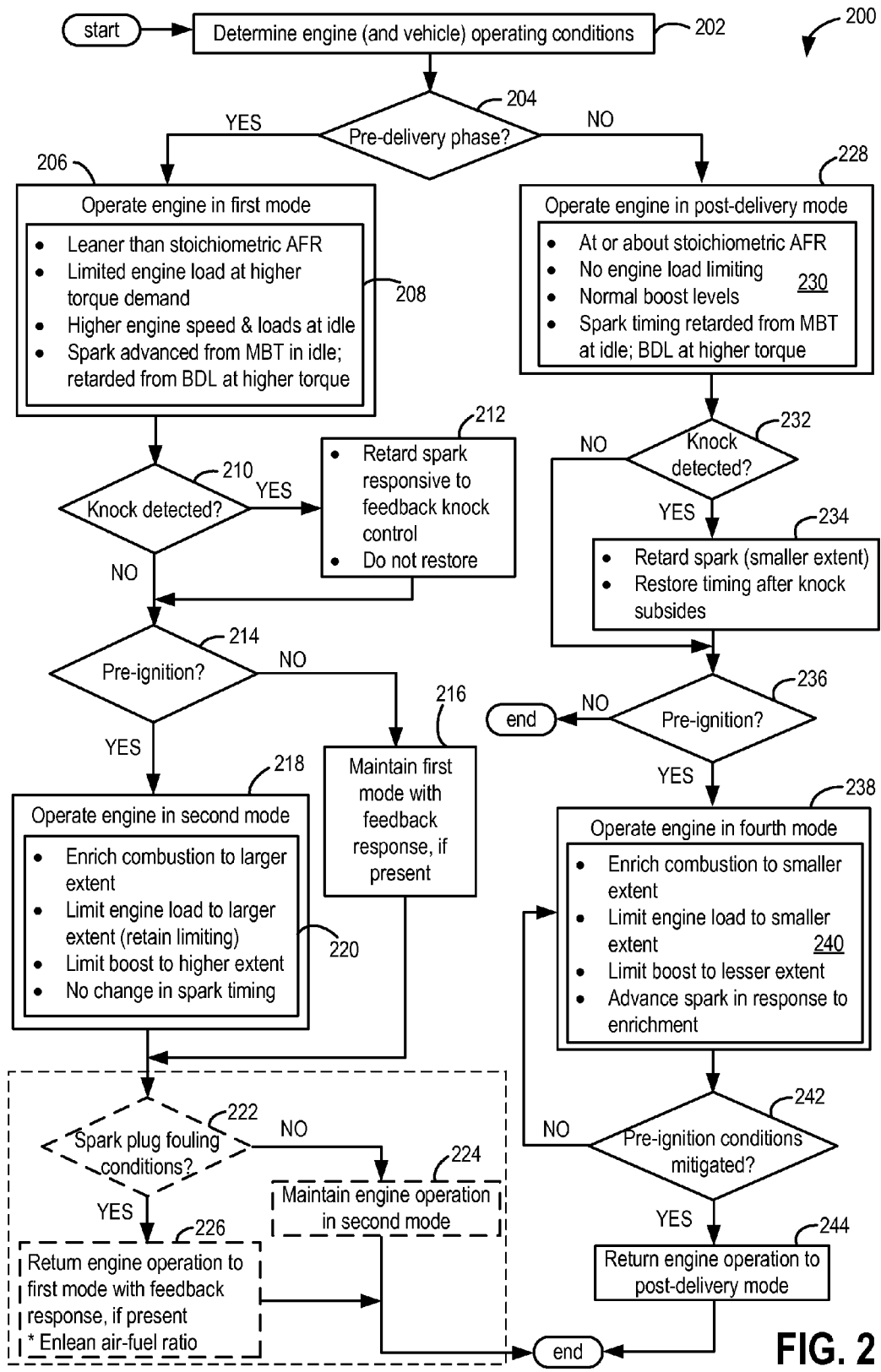
FIG. 2 depicts a high level flow chart for selecting an engine operating mode based on the vehicle being in a pre-delivery phase or a post-delivery phase, in accordance with the present disclosure.

The following detailed description relates to methods for addressing pre-ignition and spark plug fouling in an engine system, such as the engine system of FIG. 1, in a newly manufactured vehicle. A controller may be configured to select an engine operation mode based on whether the vehicle is in a pre-delivery engine calibration mode or a post-delivery calibration mode (FIG. 2). A pre-delivery calibration mode may be activated in the vehicle at a plant immediately after production of the vehicle. The pre-delivery calibration mode may be deactivated by an operator after delivery of the vehicle to a dealership. As such, various engine parameters may be controlled in diverse ways based on the vehicle being in pre-delivery mode or post-delivery mode. Initial engine operation in the pre-delivery phase may include a first setting for one or more engine parameters to control spark plug fouling. Further, pre-ignition conditions in the pre-delivery mode may be mitigated with adjustments (FIG. 3) to the first setting of the one or more engine parameters. A second setting for each of the one or more engine parameters in the post-delivery phase may be different from the first setting used in the pre-delivery phase. Additionally, adjustments may be made to the second setting of the one or more engine parameters to reduce pre-ignition in the post-delivery mode (FIG. 4). As such, engine operation in the pre-delivery mode may be dissimilar from engine operation in the post-delivery mode (FIG. 5). Further, the pre-delivery phase and calibration may be mutually exclusive from the post-delivery phase and respective calibration. In this way, pre-ignition may be reduced in a different manner in the engine system of the newly manufactured vehicle in pre-delivery phase as compared to the manner used in the post-delivery phase of the engine system.

FIG. 1 shows a schematic depiction of an example cylinder 30 in internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48 and exhaust passage 58. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In the example of FIG. 1, intake valve 52 and exhaust valve 54 may be controlled by cam actuation via respective cam actuation systems 51 and 53. Cam actuation systems 51 and 53 may each include one or more cams mounted on one or more camshafts (not shown in FIG. 1) and may utilize one or more of cam profile switching (CPS), variable cam timing (VCT), variable valve timing (VVT) and/or variable valve lift (VVL) systems that may be operated by controller 12 to vary valve operation. The angular position of intake and exhaust camshafts may be determined by position sensors 55 and 57, respectively. In alternate embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 99. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 91 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 94 arranged along intake passage 42. For a turbocharger, compressor 94 may be at least partially driven by an exhaust turbine 92 (e.g. via a shaft) arranged along exhaust passage 58. Compressor 94 draws air from intake passage 42 to supply boost chamber 46. Exhaust gases spin exhaust turbine 92 which is coupled to compressor 94 via shaft 96. For a supercharger, compressor 94 may be at least partially driven by the engine and/or an electric machine, and may not include an exhaust turbine. Thus, the amount of compression provided to one or more cylinders of the engine via a turbocharger or supercharger may be varied by controller 12.

A wastegate 69 may be coupled across exhaust turbine 92 in a turbocharger. Specifically, wastegate 69 may be included in a bypass passage 67 coupled between an inlet and outlet of the exhaust turbine 92. By adjusting a position of wastegate 69, an amount of boost provided by the exhaust turbine may be controlled.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. Throttle 62 may control airflow from intake boost chamber 46 to intake manifold 44 and combustion chamber 30 (and other engine cylinders). The position of throttle plate 64 may be provided to controller 12 by throttle position signal TP from throttle position sensor 158.

Exhaust gas sensor 126 is shown coupled to exhaust manifold 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 58 downstream of exhaust gas sensor 126 and exhaust turbine 92. Device 70 may be a three way catalyst (TWC), NOx trap, various other emission control devices, or combinations thereof.

An exhaust gas recirculation (EGR) system (not shown) may be used to route a desired portion of exhaust gas from exhaust passage 58 to intake manifold 44. Alternatively, a portion of combustion gases may be retained in the combustion chambers, as internal EGR, by controlling the timing of exhaust and intake valves.

Engine 10 may further include one or more knock sensors (not shown) for sensing abnormal combustion events and differentiating abnormal combustion events due to knocking from those indicative of pre-ignition. For example, input from an in-cylinder knock sensor and/or a crankshaft acceleration sensor may be used to indicate an abnormal combustion event in the cylinder. The knock sensor may be an accelerometer on the engine block, an in-cylinder pressure transducer, or an ionization sensor configured in the spark plug of each cylinder. Based on characteristics of the knock sensor signal, such as a signal timing, amplitude, intensity, frequency, etc., and/or based on the crankshaft acceleration signal, the controller may identify pre-ignition. For example, a cylinder pre-ignition event may be determined based on a cylinder knock signal estimated in a first, earlier window (relative to spark timing) being larger than a first, higher threshold. On the other hand, a cylinder knock event may be determined based on a cylinder knock signal estimated in a second, later window (relative to spark timing) being larger than a second, lower threshold. The windows in which the knock signals are estimated may be crank angle windows. Additionally, pre-ignition may be distinguished from knock based on the engine operating conditions at the time of abnormal combustion detection. For example, abnormal combustion detected at higher engine speeds and loads may be attributed to knocking while those at lower engine speeds and loads may be indicative of pre-ignition. As such, mitigating actions taken to address knock may differ from those taken by the controller to address pre-ignition. For example, knock may be addressed using spark retard and EGR while pre-ignition may be addressed by cylinder enrichment and with an amount of engine load limiting. In alternate embodiments, depending on the type of EGR system, EGR may also be effective in reducing pre-ignition.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, wastegate 69, fuel injector 66, and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of engine manifold pressure (MAP) from pressure sensor 121 coupled to intake manifold 44; a measurement of boost pressure from pressure sensor 122 coupled to boost chamber 46; a profile ignition pickup signal (PIP) from Hall effect sensor 118 (or other type) coupled to crankshaft 40; a measurement of air mass entering the engine from mass airflow sensor 120; a measurement of throttle position from sensor 158; air/fuel ratio (AFR) from EGO sensor 128, and abnormal combustion from a knock sensor and a crankshaft acceleration sensor. In a preferred aspect of the present description, crankshaft sensor 118, which may be used as an engine speed sensor, may produce a predetermined number of equally spaced pulses for every revolution of the crankshaft from which engine speed (RPM) can be determined. Such pulses may be relayed to controller 12 as a profile ignition pickup signal (PIP) as mentioned above.

Storage medium read-only memory 106 can be programmed with computer readable data representing instructions executable by processor 106 for performing the methods described below as well as other variants that are anticipated but not specifically listed.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time.

Engine 10 may be a newly manufactured engine included in a newly manufactured vehicle. Newly manufactured vehicles, after production, may also be filled with low octane fuels and may be parked on a production plant parking lot before they are delivered to dealerships for sale. These vehicles may be moved around the production plant parking lot over short distances. Accordingly, drive cycles may be shorter, and engines may not warm up to desired operating temperatures. As a result, new engines may be exposed to spark plug fouling due to richer combustion at cold starts and reduced opportunities for burning-off carbon deposits.

Pre-ignition events may also be triggered by low octane fuels, and aggressive driving that can occur when moving vehicles for short distances around production plant parking lots. Aggressive driving can include higher torque demand and higher boost levels. In order to address spark plug fouling and pre-ignition, an engine in a newly manufactured vehicle may be programmed with a pre-delivery calibration (e.g. prior to vehicle delivery to a dealership) that controls engine parameters to diminish spark plug fouling. The programmed parameters may be adjusted in response to pre-ignition conditions or pre-ignition events. Further, the pre-delivery calibration may be deactivated upon delivery of the newly manufactured vehicle to the dealership. The engine may then operate with a post-delivery calibration that uses less aggressive measures to address pre-ignition. Further details will be described in reference to FIGS. 2, 3, and 4 below.

FIG. 2 illustrates an example routine 200 for selecting an engine operation based on whether the engine (and vehicle) is in a pre-delivery phase. The selected engine operation may be further adjusted in response to an abnormal combustion event, such as pre-ignition, to reduce a likelihood of engine degradation due to pre-ignition combustion events.

At 202, engine and vehicle operating conditions may be determined. These conditions may include engine speed, torque demand, engine load, engine temperature, exhaust temperature, catalyst temperature, manifold air pressure, engine pre-ignition history (including an engine and/or cylinder pre-ignition count), boost pressure (where the engine includes a turbocharger), a mileage of the vehicle, an amount of fuel consumed, etc.

At 204, routine 200 may confirm if the vehicle is in a pre-delivery phase. The pre-delivery phase may include a duration prior to delivery of a newly manufactured vehicle to a dealership (or a customer). Alternatively, the pre-delivery phase may be determined by a vehicle mileage being lower than a mileage threshold (T_D). As such, a pre-delivery calibration may be activated in the newly manufactured vehicle following production and assembly of the vehicle when in the pre-delivery phase. The pre-delivery calibration may include a first setting for an engine parameter during engine operation. Further, the pre-delivery calibration may include a distinct first setting for each of a group of engine parameters. In other words, a first setting for a first engine parameter may be different from a first setting for a second engine parameter which in turn may be distinct from a first setting for a third engine parameter. Herein, each of the group of engine parameters may have a distinct, and respective first setting. The group of engine parameters may include one or more of air/fuel ratio (AFR), spark timing, engine load, boost pressure, etc. Accordingly, the pre-delivery calibration may include a first setting for AFR, a first setting for spark timing, a first setting for engine load, and a first setting for boost pressure. As such, each of the AFR, spark timing, engine load, and boost pressure may have their own respective first setting in the pre-delivery calibration. As will be explained later, each of the AFR, spark timing, engine load, and boost pressure may have their own respective second setting when the engine is operated in a post-delivery calibration in a post-delivery phase of the vehicle. The second settings may be distinct and dissimilar from the first settings.

The pre-delivery engine calibration may be activated (e.g. turned on and operative) at a production plant, in one example, by a technician. The pre-delivery engine calibration may be software-deactivatable, as in deactivatable by controller 12 of engine 10. In another example, the pre-delivery engine calibration may be deactivated by an operator upon completion of the pre-delivery phase. For example, the pre-delivery engine calibration may be deactivated when the vehicle is delivered to the dealership. In yet another example, the pre-delivery calibration may be deactivated by a technician away from the production plant.

The pre-delivery engine calibration (also termed, pre-delivery calibration) may be active during the pre-delivery phase of a vehicle. In one example, the pre-delivery phase of the vehicle may include a duration prior to the deactivation of the pre-delivery calibration. In another example, the pre-delivery phase may include a mileage of the vehicle being below a predetermined mileage threshold. Upon completion of the pre-delivery phase (e.g. mileage reaching the predetermined mileage threshold), the pre-delivery calibration may be deactivated. In yet another example, the pre-delivery phase may include engine runtime being shorter than a given threshold. In a further example, an amount of fuel consumed may determine whether the vehicle is in pre-delivery phase. Herein, if the amount of fuel consumed is lower than a threshold amount, the vehicle may be in the pre-delivery phase. In another additional example, a number of combustion events being lower than a threshold number of events, T_E, may determine the vehicle being in the pre-delivery phase. Other examples not included herein may be used to determine the pre-delivery phase without departing from the scope of the present disclosure.

Upon deactivation of the pre-delivery engine calibration, the engine may be in a post-delivery phase and may be operated in a post-delivery calibration. The post-delivery calibration may become active and operative only after deactivation of the pre-delivery calibration. Further, the vehicle may be considered to be in the post-delivery phase only after completion of the pre-delivery phase. The completion of the pre-delivery phase may be determined based upon one or more of deactivation of the pre-delivery calibration, the mileage of the vehicle achieving the predetermined mileage threshold, the fuel consumed by the vehicle attaining a threshold amount, the number of combustion events reaching the threshold number of events, etc.

At 204, if it is confirmed that the vehicle is in pre-delivery phase, the engine may be operated in a first mode at 206. As such, the first mode may include engine operation in the pre-delivery calibration. As described earlier, the pre-delivery calibration may include a first setting for a parameter, wherein the parameter is an engine parameter. Thus, a selection of engine parameters may be set to a respective first setting in the first mode (or the pre-delivery calibration). At 208, the first mode may include a first setting for AFR (or a first AFR setting) which may be leaner than stoichiometric. Further, the first setting for AFR may be leaner than a second setting for AFR, the second setting being used in the post-delivery calibration.

Additionally, at 208, the first mode may include a first setting for engine load (or a first engine load setting). Specifically, engine load may be limited during higher torque demand conditions, relative to idling conditions, in the pre-delivery phase. To elaborate, the engine load may be restricted to reduce torque production. Further, engine load may be limited by reducing airflow into one or more cylinders of the engine. In an example embodiment wherein the cylinders of the engine include valve deactivation and/or valve timing devices capable of adjusting valve timing and valve lift, airflow into each cylinder of the engine may be controlled. As such, airflow into one or more cylinders affected by pre-ignition may be reduced to limit engine loads. However, in another example embodiment wherein the cylinders of the engine do not include valve deactivation or valve timing devices, airflow to all cylinders may be reduced in order to limit engine load. Accordingly, airflow may be reduced to cylinders that experienced pre-ignition as well as those that did not pre ignite. Further still, engine load in the pre-delivery calibration may be more limited relative to the post-delivery calibration. In other words, the first setting for engine load may include a first amount of engine load limiting in the first mode that is higher relative to a second setting for engine load limiting in the post-delivery calibration. Thus, a lower engine load and a lower engine torque may be allowed in the first engine load setting relative to an allowable engine load (and torque) in the post-delivery calibration. Overall, engine load may be limited in the first mode relative to an allowable engine load in the post-delivery calibration. In other words, the first setting for engine load including the first amount of engine load limiting in the pre-delivery calibration may be more restrictive than the second setting for engine load in post-delivery calibration.

Further, the first engine load setting may be adjusted to a more conservative engine load setting in response to pre-ignition. To elaborate, the first setting for engine load may be adjusted from the first amount of engine load limiting to a second amount of engine load limiting in response to pre-ignition. As such, the first amount of engine load limiting in the first mode may be smaller than the second amount of engine load limiting. This adjustment will be further explained in reference to 220 below.

At 208, the first mode may also include a first setting for idle speed that is higher than a second setting for idle speed in the post-delivery calibration. For example, at idle, a higher load may be scheduled resulting in a higher idle speed. In one example, a higher load at idle may be attained by commanding a higher alternator output. The higher load may cause the engine to work harder and produce more heat to reduce spark plug fouling.

Further, in the pre-delivery mode, a first boost pressure setting may also include limiting an allowable boost pressure by adjusting a position of a wastegate. Herein, the wastegate may be commanded to a more open position from a more closed position. It will be noted that limiting boost pressure may result in limiting engine loads. Further still, the first boost pressure setting may be limited relative to a second setting for boost pressure in the post-delivery calibration. To elaborate, a lower level of boost pressure may be allowed in the first setting of boost pressure relative to boost pressures allowed in the second setting for boost pressure in the post-delivery calibration.

In addition to the above engine parameters, spark timing may be set to a first setting wherein the first setting may be an advanced or a retarded spark timing based on an engine condition. Further, the first setting for spark timing may be more advanced or more retarded relative to a second setting for spark timing in the post-delivery calibration. For example, in pre-delivery calibration, at lighter loads like engine idle conditions, spark timing may be advanced compared to the second setting of spark timing in post-delivery mode. To elaborate, spark timing in the pre-delivery calibration for idling conditions may be more advanced of maximum brake torque (MBT) timing. This advanced timing may allow a higher heat transfer into the spark plugs and coolant to avoid spark plug fouling. Conversely, the second setting for spark timing during idle conditions in the post-delivery mode may be retarded from MBT. Spark timing in the post-delivery phase may be retarded from MBT for catalyst heating and/or to maintain a torque reserve for fast load rejection during idle speed control. Thus, in this example, the first setting of spark timing may be more advanced relative to the second setting of spark timing in the post-delivery mode.

However, at higher torque demand during non-idling conditions, the first setting of spark timing in the pre-delivery mode may be more retarded than a borderline spark setting (the second setting for spark timing) in the post-delivery mode to avoid detonation. As mentioned earlier, newer vehicles may be fueled with poorer quality fuel, and may be more susceptible to knock and/or pre-ignition when being driven around production parking lots. Thus, at higher torque outputs relative to idle, the first setting of spark timing in the pre-delivery mode may be more retarded relative to the second setting of spark timing in the post-delivery mode. In the pre-delivery phase, a retardation in spark timing during higher torque demand may affect drivability but may not be noticeable to an operator moving the vehicle for short distances around the production parking lots. In the post-delivery phase, though, actuator settings that affect drivability and that may be perceived by the vehicle owner/driver may not be used. Overall, the first setting of spark timing may be distinct based on engine operating conditions within the same mode as in the example of the first setting for spark timing during engine idling and the first setting for spark timing during higher torque output in the pre-delivery mode.

It will be appreciated that during the pre-delivery (or first) mode, a more conservative borderline spark table may be programmed into the controller. Further, adaptive borderline spark may be deactivated in the pre-delivery mode.

As such, the first settings of each of the engine parameters listed above (e.g. AFR, engine load at idle, idle speed, spark timing at idle) may be set to reduce spark plug fouling. To elaborate, a leaner than stoichiometric AFR may be used to reduce a likelihood of rich combustion during engine cold starts, higher engine loads may be allowed during idling engine conditions relative to those allowed at engine conditions desiring higher torque demand, and a higher idle speed setting may be incorporated in the pre-delivery calibration. The higher allowable engine load during idling and the higher idle speed may enable burning off carbon deposits on the spark plug. Further, a spark timing that is advanced relative to MBT may also heat the spark plug and reduce spark plug fouling. It will be noted that the engine load may be limited at engine conditions with higher torque demand to reduce pre-ignition in the pre-delivery mode. Similarly, allowable boost pressures may be limited during higher torque outputs to counter pre-ignition conditions. It will be appreciated that the above settings of engine parameters may be used only during the pre-delivery engine calibration during the pre-delivery phase of the vehicle.

At 210, it may be determined if knock is detected. The occurrence of knock may be due to an abnormal combustion event occurring in one or more cylinders of the engine. If knock is confirmed, routine 200 progresses to 212 for retarding spark timing in response to feedback knock control. The amount of retard in response to knock may be greater in pre-delivery mode relative to post-delivery phase. Also, open loop borderline spark setting may be more retarded than that in the post-delivery calibration. Further, in the pre-delivery calibration, spark timing may not be restored when knock subsides. Accordingly, a retarded spark timing may be maintained in engine operation following the detonation event. Routine 200 may then continue to 214.

If knock is not detected at 210, routine 200 may progress to 214 where it may confirm if pre-ignition is present. Alternatively, at 214, it may be determined if pre-ignition is imminent or pre-ignition conditions are occurring. As previously elaborated, a cylinder pre-ignition event may be identified and distinguished from cylinder knocking based on the output of a knock sensor. For example, pre-ignition may be determined in response to a knock signal output by the knock sensor being larger than a higher threshold in a first crank angle window that is earlier than a second crank angle window when knock may be detected. In other examples, pre-ignition may be indicated based on output from an ionization sensor and/or an in-cylinder pressure transducer.

If pre-ignition is not confirmed, routine 200 may continue to 216 to maintain the first mode of operation with the pre-delivery engine calibration. Further, if spark timing has been retarded in response to knock, the engine may be operated with the spark retard. Thus, feedback response to knock may be retained in engine operation. Routine 200 may then continue to 222 where an optional check for spark fouling conditions may be performed. If the optional check is skipped, routine 200 may end after 216.

Returning to 214, if pre-ignition is confirmed, routine 200 may progress to 218 where the engine may be operated in a second mode. The second mode of engine operation may include an adjusted first mode. To elaborate, the second mode of engine operation may include adjustments to the first setting(s) of one or more engine parameters used in the pre-delivery calibration. Accordingly, at 220, the first setting of AFR (e.g. leaner than stoichiometric setting) may be adjusted to a setting that is richer than stoichiometry. As such, combustion may be enriched to a greater extent in response to pre-ignition. As an example, an enrichment may be provided in response to pre-ignition which may be tapered off with time. A first combustion event following detection of pre-ignition could be richer but may be followed by leaner events. Alternatively, instead of a single richer combustion event, a number of consecutive combustion events may be richer than stoichiometry. The controller may select an option based on a balance between protecting the engine from pre-ignition while reducing spark plug fouling.

In one example, all cylinders may be fueled with the adjusted AFR setting (e.g. richer than stoichiometry). In another example, only the affected cylinders may be enriched to combust with the adjusted AFR setting. The adjusted AFR may include a significantly rich AFR in response to pre-ignition relative to the first leaner than stoichiometric setting of AFR at 208. In other words, combustion may be enriched by a second amount of fuel in response to pre-ignition in the pre-delivery phase that is greater than a first amount of fuel provided to maintain the first setting of AFR (at 208) in the pre-delivery mode. Further still, the second amount of fuel delivered in response to pre-ignition in the pre-delivery phase may also be greater than an amount of fuel provided in response to pre-ignition in the post-delivery phase. In another example though, if spark plug fouling is detected, the enrichment provided in response to pre-ignition in the pre-delivery mode may be leaner than that provided in response to pre-ignition in the post-delivery mode. This enrichment will be further explained in reference to 240 below.

At 220, in addition to adjusting the first setting of AFR, the first setting of engine load may also be adjusted to provide a higher amount of engine load limiting responsive to pre-ignition. To elaborate, the adjusted engine load in response to pre-ignition may include a higher amount of limiting relative to the first setting for engine load in the pre-delivery calibration. As such, the adjusted engine load limit may be more restrictive than the first setting for engine load limit. In other words, a lower engine load and a lower engine torque output may be allowed in the second (or adjusted first) mode relative to an allowable engine load (and torque output) in the first mode or pre-delivery calibration. Overall, engine load may be limited to a greater extent in the second mode (the adjusted first mode) relative to the limiting of engine load in the first mode.

To elaborate further, the first setting for engine load in the first mode may include a first amount of engine load limiting and the second mode (or the adjusted first mode) may include a second amount of engine load limiting. Further, the first amount of engine load limiting may be lower relative to the second amount of engine load limiting in the second mode (or adjusted first mode). In other words, the second amount of engine load limiting (in response to pre-ignition) may be greater than the first amount of engine load limiting (first setting for engine load) in the first mode. Thus, a larger amount of engine load limiting may be applied in response to pre-ignition in the pre-delivery phase relative to the first amount of engine load limiting in the first mode.

Further still, the second amount of engine load limiting responsive to pre-ignition in the pre-delivery phase may be greater than an adjusted second setting for engine load responsive to pre-ignition in the post-delivery calibration. As such, the adjusted engine load limit of the first setting in response to pre-ignition in the pre-delivery phase may be more restrictive than an adjustment to a second setting of engine load in the post-delivery calibration responsive to pre-ignition. To elaborate, the load limit applied upon occurrence of pre-ignition in the pre-delivery mode may be more restrictive than the load limit applied in response to pre-ignition when the vehicle is in post-delivery mode. For example, when in the post-delivery mode, a reduction of 10% in engine load may be applied after detection of at least 3 pre-ignition events. In contrast, when the vehicle is in pre-delivery mode, a reduction of 20% in engine load may occur in response to a single occurrence of pre-ignition. Furthermore, the load may not be allowed to return to pre-limiting levels in the pre-delivery mode. Thus, the reduction of 20% in engine load may be maintained even after pre-ignition subsides. In other words, the adjusted first setting for engine load may be retained such that engine operation may continue with the second amount of engine load limiting even after pre-ignition is diminished. On the other hand, in the post-delivery mode, engine load limiting may be removed and engine load may be allowed to return to pre-limiting levels once pre-ignition conditions cease.

In one example, the first setting of engine load and the first setting of AFR may each be adjusted simultaneously to mitigate the effects of the pre-ignition event. In another example, only one of the first setting of engine load and the first setting of AFR may be adjusted in response to pre-ignition.

As used herein, limiting the engine load may include limiting airflow into one or more cylinders of the engine. As explained earlier, in some embodiments which do not comprise valve deactivation and/or valve timing devices, airflow to all cylinders of the engine may be reduced to limit engine load. Further, airflow may be limited by one or more of reducing an opening of an intake throttle, increasing an opening of a turbocharger wastegate, and adjusting a cylinder valve timing to reduce an intake aircharge.

Additionally, at 220, a higher amount of limiting may be applied to boost pressure relative to the amount of limiting applied to boost pressure in the first mode. As described above, opening the wastegate may reduce airflow and limit boost. Thus, the limit for boost pressure may be adjusted to the higher amount, and an allowable boost level in the second (or adjusted first) mode may be lower than an allowable boost pressure in the first mode.

It will be noted that spark timing may not be adjusted responsive to pre-ignition. Spark retard may not control pre-ignition since during pre-ignition abnormal combustion events may be initiated before a spark is provided within a given cylinder. However, if spark timing is already retarded due to knock (such as the spark retard at 212), the timing of spark may be maintained at this retarded timing. Routine 200 may end after adjusting the first settings for the engine parameters in response to pre-ignition. Herein, the engine may be operated in the second (or adjusted first) mode during later engine starts and later drive cycles. It will be noted, though, that during idling a higher load may be applied as described earlier for reducing spark plug fouling. Further, spark timing may be adjusted to an advanced timing relative to MBT when the engine is idling.

Optionally, routine 200 may continue to 222 to check for spark fouling conditions. If spark plug fouling conditions are determined at 222, engine operation may be returned to the first mode at 226. A retarded spark timing, specifically used in response to knock (as at 212), may be retained when the engine is returned to the first mode of operation. However, when the engine is operating at idle or near idle, spark timing may be advanced relative to both borderline spark and MBT for heating the spark plugs and reducing spark fouling. As such, at lighter engine loads encountered during idle, knock and pre-ignition events may not be present. Further, if spark plug fouling is indicated at 222, the air/fuel ratio may be adjusted to a leaner AFR at 226 when in the pre-delivery phase. The enleanment may be based on a degree of spark plug fouling.

Thus, the controller may maintain a balance between remedial actions taken to address pre-ignition and spark plug fouling during the pre-delivery phase. To elaborate, the engine in pre-delivery calibration may initially operate with a leaner than stoichiometric AFR to reduce spark plug fouling (at 208 in routine 200). In response to pre-ignition (or pre-ignition conditions), the AFR may be adjusted to a richer than stoichiometric ratio. Further, the enrichment provided in response to pre-ignition during the pre-delivery phase may be substantial (at 220 in routine 200). The controller may continue to monitor for spark plug fouling, and if conditions indicate a likelihood of spark plug fouling, the enrichment in response to pre-ignition may be reduced (at 226). Further still, the AFR may be adjusted to a leaner than stoichiometric ratio to address spark plug fouling.

If spark plug fouling conditions are not detected at 222, engine operation may be maintained in the second (or adjusted first) mode at 224 and routine 200 may end.

It will be appreciated that even though multiple engine parameters may be adjusted in response to pre-ignition in routine 200, in other examples, only one engine parameter may be selected to be adjusted. The engine parameter selected for adjustment in response to pre-ignition may be chosen based on the severity of pre-ignition. Further, a level of the adjustment to the engine parameter responsive to pre-ignition may be based on the degree of pre-ignition. For example, if the selected engine parameter is AFR, the level of adjustment to AFR may be different based on the level of pre-ignition and its rate of occurrence. As an example, a higher amount of enrichment may be provided in response to a higher degree of pre-ignition while in the case of a smaller degree of pre-ignition, a lower amount of enrichment may be provided. In either case, the enrichment to AFR in response to pre-ignition may be greater than the enrichment to AFR provided in the first mode to address spark plug fouling. In other words, in either example described above, a higher amount of fuel may be injected in response to pre-ignition in the pre-delivery phase than the amount of fuel delivered in the first mode in the pre-delivery phase.

In other examples, depending on the severity of pre-ignition, more engine parameters may be selected for adjustments. In one example, AFR and engine load may be adjusted simultaneously. In another example, engine load and boost pressure limits may be adjusted together. As such, by limiting boost, engine loads may be limited. Herein, each selected parameter may be adjusted by a different amount based on the degree of pre-ignition. For example, if AFR and engine load are the selected parameters, depending on the severity of pre-ignition, a higher enrichment may be provided while engine load may be limited by a smaller degree. Alternatively, the degree of enrichment may be lower and engine loads may be limited by a larger amount in response to pre-ignition.

Thus, in the pre-delivery phase of the newly manufactured vehicle (and newly manufactured engine), the engine may operate with a pre-delivery calibration in the first mode. The pre-delivery calibration may largely address spark plug fouling so as to reduce a likelihood of spark plug fouling. Thus, a first setting for AFR may be leaner than stoichiometric, spark timing may be advanced relative to MBT at idling to heat the spark plugs, and a higher idling load may be commanded to achieve higher temperatures in the cylinders to reduce spark plug fouling. Further, engine loads may be limited at non-idling conditions to provide a lower than demanded torque output in order to mitigate a likelihood of pre-ignition. However, if pre-ignition events or conditions are indicated, the first settings for each of AFR, engine load, boost pressure, etc. may be modified to address pre-ignition. Accordingly, combustion events may be enriched to provide a richer than stoichiometric AFR, allowable engine loads may be further limited, and allowable boost pressure may be additionally restricted. Further still, if these remedial actions (e.g. AFR enrichment) result in increasing the probability of spark plug fouling, the remedial actions may be modified to address spark plug fouling. As an example, the enrichment in AFR provided in response to pre-ignition may be reduced if spark plug fouling conditions are indicated. As such, the amount of injected fuel may be lowered and the AFR may be adjusted to a leaner ratio. Herein, the higher amount of limiting on engine loads in response to pre-ignition may be retained. Further still, the higher amount of limiting may also be held after pre-ignition subsides.

Therefore, an example method may comprise, during a pre-delivery phase of a vehicle including an engine, operating the engine with a first setting for air/fuel ratio to reduce spark plug fouling, and adjusting the first setting of the air/fuel ratio responsive to pre-ignition. The first setting for air/fuel ratio, herein, may be leaner than stoichiometry, and the adjusting of air/fuel ratio responsive to pre-ignition may include adjusting the air/fuel ratio to substantially richer than stoichiometry. The method may further comprise modifying the adjusted air/fuel ratio in response to spark plug fouling, the modifying including an enleaning of the adjusted air/fuel ratio (as described in reference to 226 in routine 200). The method may also include operating the engine during the pre-delivery phase with a first setting for engine load, and adjusting the first setting of engine load in response to pre-ignition. Herein, the first setting for engine load may include limiting the engine load by a first amount, and wherein the adjusting responsive to pre-ignition includes limiting the engine load by a second amount, the second amount being greater than the first amount. The method may further comprise retaining the limiting of engine load by the second amount after pre-ignition subsides. As such, engine load may be limited by limiting airflow into one or more cylinders of the engine affected by pre-ignition. Reducing airflow to only the cylinders affected by pre-ignition may be possible with cylinders configured for valve deactivation and including devices to adjust valve timing and valve lift. Alternatively, in engine embodiments wherein the cylinders are not deactivatable or do not comprise valve timing devices, airflow to all cylinders of the engine may be reduced to limit engine load. Airflow may be limited by one or more of reducing an opening of an intake throttle, increasing an opening of a turbocharger wastegate, and adjusting cylinder valve timing to reduce an intake aircharge. The method may also include operating the engine with a spark timing that is advanced relative to maximum brake torque (MBT) timing during engine idling conditions.

Returning now to 204, if it is determined that the vehicle is not operating in pre-delivery phase, the vehicle may be determined to be in post-delivery phase and a post-delivery mode of operation may be chosen at 228. The post-delivery phase of the vehicle may occur only after the pre-delivery phase is completed, and may include at least one of a duration after the deactivation of the pre-delivery engine calibration, and the mileage of the vehicle being above a predetermined mileage threshold. Herein, the predetermined threshold for mileage may differentiate the pre-delivery phase from the post-delivery phase. The pre-delivery calibration may be deactivated via operator input after the vehicle is delivered to a dealership. The post-delivery phase may also be determined by a number of combustion events. As an example, if the number of combustion events is greater than a threshold number of combustion events, it may be determined that the vehicle is in its post-delivery phase. In another example, an amount of fuel consumed may confirm that the vehicle is not in pre-delivery phase. Herein, if the amount of fuel consumed exceeds a threshold amount, the vehicle may be in the post-delivery phase. As will be noted, the post-delivery phase and the pre-delivery phase may be mutually exclusive of each other. The post-delivery mode may include a post-delivery calibration comprising a second setting for an engine parameter during engine operation. In one example, the post-delivery engine calibration may be activated (and made operative) by a technician away from the production plant. In another example, the post-delivery calibration may be automatically activated when the pre-delivery calibration is deactivated. In yet another example, the controller may activate the post-delivery calibration. By activating the post-delivery calibration, engine operation may be controlled based on the post-delivery calibration.

The post-delivery calibration may include a distinct second setting for each of a group of engine parameters. In other words, a second setting for a first engine parameter may be different from a second setting for a second engine parameter which in turn may be distinct from a second setting for a third engine parameter. Herein, each of the group of engine parameters may have a distinct, and respective second setting. The group of engine parameters may include, similar to the pre-delivery calibration, one or more of air/fuel ratio (AFR), spark timing, engine load, boost pressure, etc. Accordingly, the post-delivery calibration may include a second setting for AFR, a second setting for spark timing, a second setting for engine load, and a second setting for boost pressure. As such, each of the AFR, spark timing, engine load, and boost pressure may have their own respective second setting in the post-delivery calibration (also termed post-delivery mode). It will also be appreciated that the second settings for each of the group of engine parameters may be dissimilar and distinct from their respective first settings. To elaborate, the first setting for AFR in the pre-delivery calibration may be dissimilar from the second setting for AFR in the post-delivery calibration. Similarly, the first setting for spark timing in the pre-delivery calibration may be dissimilar from the second setting for spark timing in the post-delivery calibration. Likewise, the first setting for engine load in the pre-delivery calibration may be distinct from the second setting for engine load in the post-delivery calibration.

Similar to the pre-delivery calibration, a selection of engine parameters may be set to their respective second setting(s) in the post-delivery mode (or the post-delivery calibration). As shown at 230, the post-delivery mode may include the second setting for AFR (or a second AFR setting) which may be at or about stoichiometry. Thus, the second setting for AFR may be distinct from the first setting for AFR (which is leaner than stoichiometric) in the pre-delivery calibration. Further, the first setting for AFR in the pre-delivery calibration may be leaner than the second setting for AFR in the post-delivery calibration. In other words, the second setting for AFR in the post-delivery calibration may be richer than the first setting for AFR in the pre-delivery calibration. Further still, the second setting for AFR in the post-delivery calibration (or post-delivery mode) may be different and distinct from the adjusted first setting used in response to pre-ignition in the second mode. Specifically, the second setting for AFR may be leaner than the adjusted first setting for AFR in response to pre-ignition (e.g. in the second mode). Therefore, the adjusted first setting of AFR in the second mode may be richer than the second setting of AFR in the post-delivery mode. Further, each of the adjusted first setting of AFR (in the second mode) and the second setting of AFR (in the post-delivery mode) may be richer than the first setting of AFR (in the first mode).

Additionally, at 230, the post-delivery mode may include a second setting for engine load (or a second engine load setting). Specifically, engine load may not be limited during the post-delivery phase. To elaborate, the engine load may not be restricted and the engine may provide a demanded level of torque. Thus, engine load in the post-delivery calibration may be less limited relative to the first setting for engine load in the pre-delivery calibration.

In other words, the first amount of engine load limiting in the first mode at the first setting is higher relative to the second setting for engine load in the post-delivery calibration. As explained above, the post-delivery calibration may not limit engine load. Therefore, the first setting for engine load in the pre-delivery calibration may comprise a higher amount of load limiting than an amount of load limiting (e.g. zero) in the post-delivery mode. Further, the first setting for engine load in the pre-delivery calibration may be more restrictive than the load limiting (e.g. zero) in the post-delivery calibration.

It will also be noted that the amount of load limiting (e.g. zero) in the second setting for engine load in the post-delivery mode may be significantly smaller than the adjusted first setting of engine load in response to pre-ignition. That is, a more conservative engine load limit may be applied in the second mode (or adjusted first mode) in response to pre-ignition. Further, it will also be appreciated that the second amount of engine load limiting used in response to pre-ignition in the second mode (at 220) may be greater than the first amount of engine load limiting in the first setting for engine load in the first mode, which in turn may be higher than the amount of load limiting (e.g. none) applied in the post-delivery calibration. Therefore, an engine operating in the post-delivery calibration may experience greater loads (and provide a higher torque output) compared to those experienced (and torque provided) in the first mode (or pre-delivery calibration) and the second (or adjusted first) mode.

At 230, a second setting for spark timing that provides catalyst heating and/or maintains a torque reserve for fast load rejection during idle speed control may be chosen for idle conditions. For example, during a cold start, spark timing may be retarded from MBT to enable catalyst heating. If the catalyst has attained light-off, spark timing may be retarded from MBT to maintain a desired torque reserve. As such, spark timing may be adjusted based on engine cold start and other idling conditions. As explained earlier in reference to 208, the first setting of spark timing in the pre-delivery mode at lighter loads like idle conditions may be advanced compared to the second setting of spark timing in the post-delivery mode. As such, in the pre-delivery mode, the first setting for spark timing may be advanced from MBT timing for heating the spark plugs.

At higher engine loads during non-idling conditions, the second setting for spark timing may be at borderline spark. In comparison, the first setting for spark timing at higher torque demands (at non-idling conditions) in the pre-delivery mode may be more retarded than the second setting e.g., borderline spark, in the post-delivery mode. As described earlier, the first setting for spark timing at higher torque demands (at non-idling conditions) in the pre-delivery mode may be more retarded than borderline spark to reduce detonation.

Further still, boost pressure may not be limited in the post-delivery mode allowing for the engine to operate at higher boost levels, and at higher engine loads than those allowed in the first mode and the second mode. Accordingly, airflow into engine cylinders may not be limited in the post-delivery mode.

At 232, routine 200 may determine if knock is detected. As mentioned earlier, knock may be detected via knock sensors or ionization sensors. If knock is detected, at 234, spark timing may be retarded from its second setting. Further, spark timing may be restored once knock subsides. It will be noted here that, during pre-delivery phase or first mode of engine operation, spark timing may be retarded responsive to engine knock, and the retarded spark timing may be retained even after engine knock subsides. In the post-delivery mode during post-delivery phase, spark timing may be retarded (relative to the second setting for spark timing) responsive to engine knock, and further, spark timing may be restored to the second setting after engine knock subsides. A smaller amount of spark retard may be applied in the post-delivery mode in response to knock relative to the spark retard applied in the first mode in response to knock. Also, an open loop borderline spark setting may be more retarded in the pre-delivery mode relative to that in the post-delivery calibration. Routine 200 may then progress to 236.

Returning to 232, if knock is not detected, routine 200 may continue to 236 to confirm if pre-ignition is detected. Alternatively, at 236, routine 200 may determine if pre-ignition conditions are present or if a pre-ignition event is imminent. Pre-ignition events may be determined via knock sensors. If pre-ignition is not detected, routine 200 may end.

However, if pre-ignition is determined at 236, routine 200 continues to 238 where engine operation may be transitioned to a fourth mode. As such, the fourth mode may include an adjusted post-delivery mode wherein one or more of the second settings of the one or more engine parameters may be adjusted in response to pre-ignition.

Accordingly, at 240, combustion may be enriched to being richer than stoichiometry to address pre-ignition. Thus, the second setting for AFR may be adjusted to a richer AFR to address pre-ignition. However, the enrichment provided to the engine (or affected cylinders) may be smaller than a corresponding enrichment provided in response to pre-ignition in the second mode (or adjusted first mode) at 220.

Referring to the earlier description for 208, the second setting of AFR may be adjusted responsive to pre-ignition to a smaller extent than the corresponding adjusted first setting of AFR in response to pre-ignition. In other words, combustion may be enriched at 240 by a third amount of fuel to mitigate pre-ignition wherein the third amount is smaller than the second amount of fuel provided to mitigate pre-ignition in the second mode at 220. Further still, the third amount of fuel may be greater than the first amount of fuel provided to reduce spark plug fouling in the first setting for AFR in the pre-delivery calibration at 208. To clarify, the second amount of fuel delivered in the second mode to mitigate pre-ignition (at 220) may be the largest amount of fuel delivered in the four modes (pre-delivery or first mode, adjusted pre-delivery or second mode, post-delivery mode, and adjusted post-delivery or fourth mode) in this example. The third amount of fuel provided in the fourth mode may be greater than the amount of fuel provided to maintain AFR at or about stoichiometry (at 230) in the post-delivery mode. The first amount of fuel to provide a leaner than stoichiometry AFR in the first mode may be the smallest amount of fuel used in the four modes in this example.

In an alternate example, if spark plug fouling is detected during the pre-delivery mode, it may be possible that enrichment provided in response to pre-ignition in the second mode may be leaner than the enrichment provided in response to pre-ignition in the adjusted post-delivery mode (or fourth mode). Herein, the third amount of fuel to mitigate pre-ignition in the post-delivery mode may be greater than the second amount of fuel delivered to mitigate pre-ignition in the adjusted pre-delivery mode (at 220).

At 240, in addition to adjusting the second setting of AFR, the second setting for engine load may also be adjusted such that engine load limiting may be provided responsive to pre-ignition. As mentioned earlier in reference to 230, in the post-delivery mode, engine loads may not be limited thus delivering a demanded torque. In response to pre-ignition though, engine loads may be limited. Further, a third amount of engine load limiting may be applied at 240 to reduce torque generation. Thus, a reduced engine load may be allowable in the fourth mode relative to the engine load allowed in the post-delivery mode.

As described earlier, the first setting for engine load in the first mode in the pre-delivery phase may include the first amount of engine load limiting and the second mode (also in the pre-delivery phase) may include the second amount of engine load limiting which may be applied in response to pre-ignition. Further, the first amount of engine load limiting may be lower relative to the second amount of engine load limiting in the second mode (or adjusted first mode). In relation, the third amount of engine load limiting in response to pre-ignition in the post-delivery phase may be greater than the first amount of engine load limiting and smaller than the second amount of engine load limiting. Thus, a larger amount of engine load limiting may be applied in response to pre-ignition in the pre-delivery phase than that applied in response to pre-ignition in the post-delivery phase in the fourth mode. As such, the adjusted first setting of engine load in the pre-delivery phase may be more restrictive than the adjusted second setting for engine load in the post-delivery phase. In other words, a lower engine load and a lower engine torque may be allowed in the second (or adjusted first) mode relative to an allowable engine load (and torque) in the fourth mode or adjusted post-delivery mode, each in response to pre-ignition. Overall, engine load may be limited to a greater extent in the second mode in order to reduce pre-ignition relative to the allowable engine load in the first mode, the post-delivery mode or the fourth mode in response to pre-ignition. As described earlier, limiting the engine load may include limiting airflow into one or more cylinders of the engine. Alternatively, in engine embodiments wherein the cylinders are not deactivatable or do not comprise valve timing devices, airflow to all cylinders of the engine may be reduced to limit engine load.

Therefore, an example method for an engine in a vehicle may include, during a pre-delivery phase of the vehicle, operating the engine with a first amount of load limiting, increasing the first amount of load limiting to a second amount responsive to pre-ignition, and during a post-delivery phase of the vehicle, operating the engine without load limiting, and in response to pre-ignition, increasing the load limiting by a third amount. The first amount of load limiting (in the first mode of FIG. 2) may be smaller than each of the second amount of load limiting (in the second mode of FIG. 2) and the third amount of load limiting (in the fourth mode of FIG. 2). Further, the second amount of load limiting may be higher than each of the first amount of load limiting and the third amount of load limiting, and wherein the third amount of load limiting may be smaller than the second amount of load limiting and greater than the first amount of load limiting. Thus, the second setting of engine load and the second setting of AFR in the port-delivery mode may each be adjusted together to mitigate the effects of the pre-ignition event (in the fourth mode). In one example, only one of the second setting of engine load and the second setting of AFR may be adjusted in response to pre-ignition.

Additionally, at 240, boost pressure may be limited in response to pre-ignition. However, a lower amount of limiting may be applied herein such that boost pressure may be limited to a lesser extent. The lower amount of limiting to boost pressure in the fourth mode may be relative to the amount of limiting applied to boost pressure in the second mode. In other words, an allowable boost level in the second (or adjusted first) mode may be lower than an allowable boost level in the fourth mode, each in response to pre-ignition. In one example, the allowable boost level in the fourth mode may be lower than the allowable boost level in the first mode. To elaborate, the engine in the post-delivery phase may function with a lower level of boost in response to pre-ignition than if the engine were operating in the pre-delivery calibration in the first mode. Further still, the allowable boost in the first mode may be lower than the allowable boost in the post-delivery mode. Herein, the engine in the pre-delivery calibration may operate at a lower boost than the same engine when operated in the post-delivery calibration. In other words, a greater amount of boost may be allowed in the post-delivery mode relative to all other modes. Accordingly, in the post-delivery calibration, engine performance may be enhanced relative to that in the pre-delivery calibration. Further, the amount of limiting applied on boost pressure in the second mode may be higher than all other modes. Herein, the engine may be operated in a more restricted manner to reduce degradation due to pre-ignition in the pre-delivery phase.

Thus, during the pre-delivery phase, the boosted engine may be operated in its pre-delivery calibration with a first, higher enrichment, and a first level of limited boost in response to a pre-ignition event (e.g. in the second mode). During the post-delivery phase, the pre-delivery calibration may be deactivated and the boosted engine may be operated with a second, lower enrichment, and a second level of limited boost in response to a pre-ignition event. Further, the first level of limited boost may include limiting boost by a higher amount, and wherein the second level of limited boost includes limiting boost by a smaller amount. Thus, the second level of limited boost may be lower than the first level of limited boost. In other words, the first level of limit on boost may be higher than the second level of limit on boost. In this manner, a pre-ignition event in the pre-delivery phase may be addressed with more aggressive methods (e.g. higher enrichment, increased load limiting) compared to remedial actions for reducing pre-ignition in the post-delivery phase (e.g. lower enrichment, lesser restriction on boost and engine load).

At 240, spark timing may be adjusted responsive to pre-ignition. In one example, spark timing may be advanced by a certain amount in response to pre-ignition and in response to enrichment of air/fuel ratio. For example, spark may be advanced between 0 to 4 degrees to recover torque from operating the engine (or cylinder) at an AFR that may be richer than rich best torque (RBT). Therefore, during enriched combustion in response to pre-ignition, spark timing may be adjusted (e.g. advanced) depending on engine operating conditions, and the amount of richness in the cylinder(s). Thus an example method may comprise adjusting the second setting for the engine parameter in the post-delivery calibration responsive to pre-ignition differently than the adjusting of the first setting for the parameter in response to pre-ignition during pre-delivery phase. In the example of the engine parameter being AFR, during pre-delivery phase, the adjusting of the first setting may include enriching AFR by a first, larger amount in response to pre-ignition. Further, during post-delivery phase, the adjusting of the second setting may include enriching AFR by a second, smaller amount in response to pre-ignition. The enrichment provided in response to pre-ignition may be reduced in both situations (more particularly in the pre-delivery mode) if spark plug fouling is indicated.

As described earlier, even though multiple engine parameters may be adjusted in response to pre-ignition in the post-delivery phase as shown in routine 200, in other examples, only one engine parameter may be selected to be adjusted. The engine parameter selected for adjustment in response to pre-ignition may be chosen based on the severity of pre-ignition. Further, a level of the adjustment to the engine parameter responsive to pre-ignition may be different based on the degree of pre-ignition. For example, if the selected engine parameter is AFR, the level of adjustment to the AFR may be different based on the level of pre-ignition. As an example, a higher amount of enrichment may be provided in response to a higher degree of pre-ignition while in the case of a smaller degree of pre-ignition, a smaller amount of enrichment maybe provided to the affected cylinder(s). In alternate examples, the number of combustion events that enrichment is provided for may be varied based on the magnitude of pre-ignition. In other examples, depending on the severity of pre-ignition, more engine parameters may be selected for adjustments. In one example, AFR and engine load may be adjusted. In another example, AFR and boost pressure limits may be adjusted. Herein, each selected parameter may be adjusted by a different amount based on the degree of pre-ignition. For example, if boost pressure and AFR are the selected parameters, depending on the severity of pre-ignition, a higher limit may be applied to boost pressure while AFR may be enriched to a smaller extent. Alternatively, the limit on boost pressure may be lower and a larger amount of enrichment may be provided.

Next, at 242, routine 200 may confirm if pre-ignition has been mitigated. If not, routine 200 continues engine operation in the fourth mode. If yes, routine 200 continues to 244 to return engine operation to the post-delivery mode. As an example, the third amount of engine load limiting (applied at 240) may be removed once pre-ignition subsides and engine operation may proceed without any load limiting. Routine 200 may then end.

Thus, a method for controlling pre-ignition and spark plug fouling in an engine in a newly manufactured vehicle may comprise, during a pre-delivery phase of a vehicle including an engine, operating the engine with a first setting for a parameter in a pre-delivery calibration, adjusting the first setting of the parameter responsive to pre-ignition, and during a post-delivery phase of the vehicle, operating the engine with a second setting for the parameter in a post-delivery calibration.

Further, the post-delivery calibration may be different from the pre-delivery calibration, and the second setting for the parameter may be different from the adjusted first setting of the parameter responsive to pre-ignition in the pre-delivery phase. As observed when comparing 208, 220, and 230, the second settings for each of the engine parameters may be different from their respective first settings. Also, the adjusted first settings for each of the engine parameters used in the second mode in response to pre-ignition may be dissimilar from the second settings for each of the engine parameters.

In one example, the engine parameter may be air/fuel ratio (AFR). In another example, the engine parameter may be engine load. In the example where the parameter is AFR, the second setting for AFR in the post-delivery calibration may be richer than the first setting for AFR in the pre-delivery calibration. Further, the second setting for AFR in the post-delivery calibration may be leaner than the adjusted first setting for AFR responsive to pre-ignition in the pre-delivery phase. The adjusted first setting of AFR responsive to pre-ignition may, in some examples, be enleaned if spark plug fouling is indicated. Overall, adjustments to engine parameters may be performed with a view to address degradation from pre-ignition and degradation of spark plugs.

In another example, the engine parameter may be engine load, and the method may comprise, during pre-delivery phase, limiting engine load by a first, higher amount responsive to pre-ignition, and during the post-delivery phase, limiting engine load by a second, lower amount in response to pre-ignition.

Figure 3:
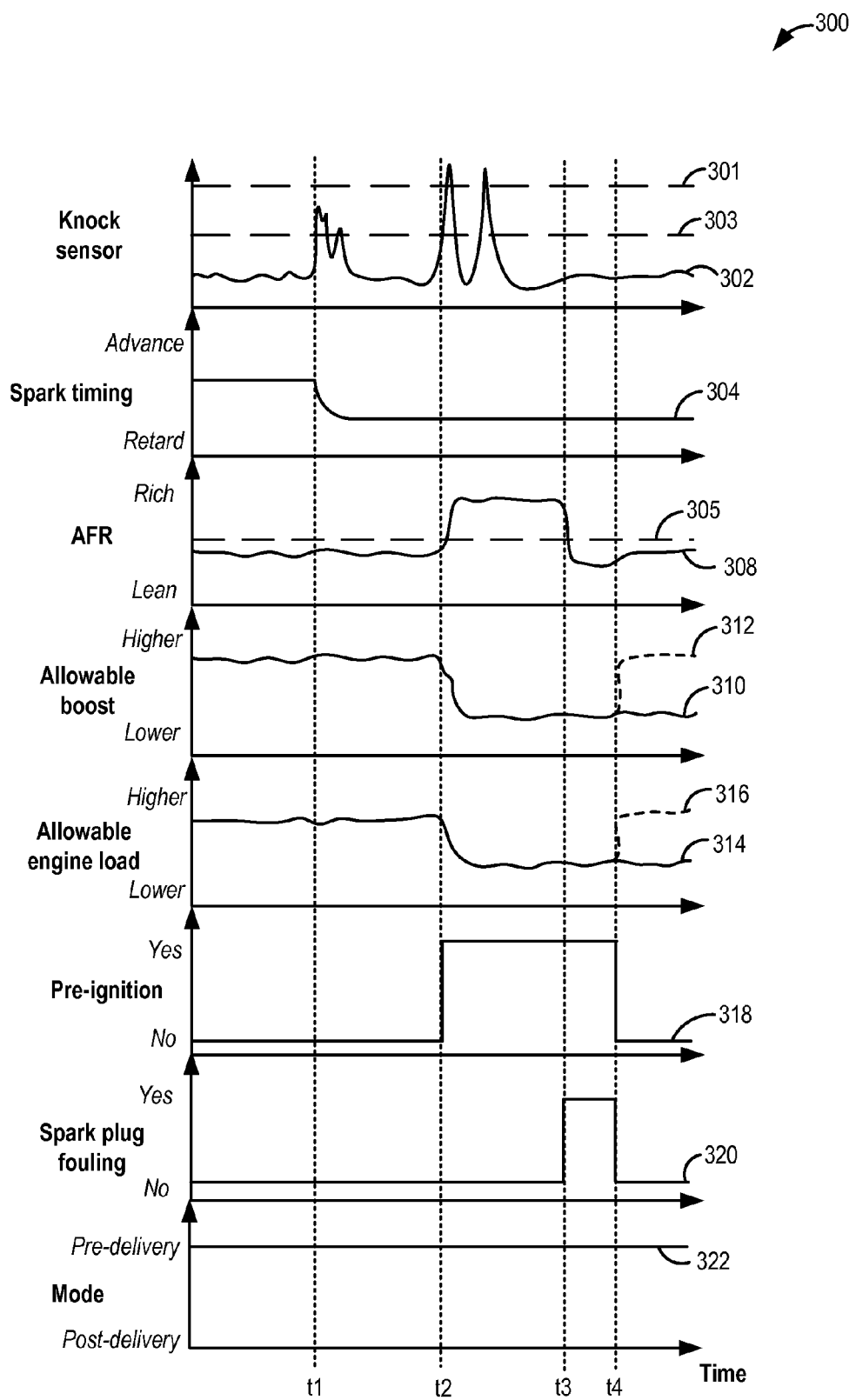
FIG. 3 is an example control operation of the engine when the vehicle is in pre-delivery phase, according to the present disclosure.
Figure 4:
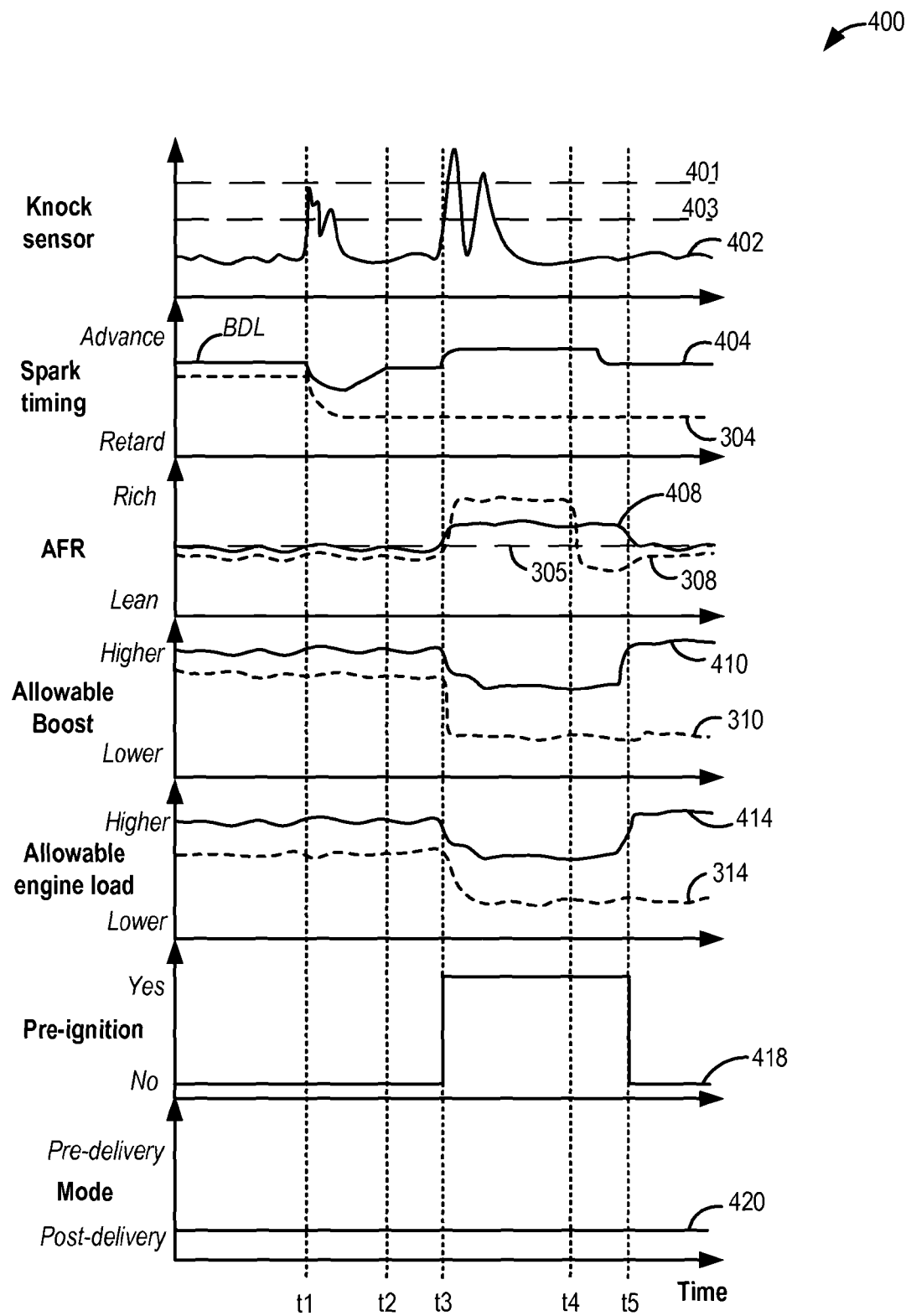
FIG. 4 is an example control operation of the engine when the vehicle is in post-delivery phase, in accordance with the present disclosure.
Figure 5:
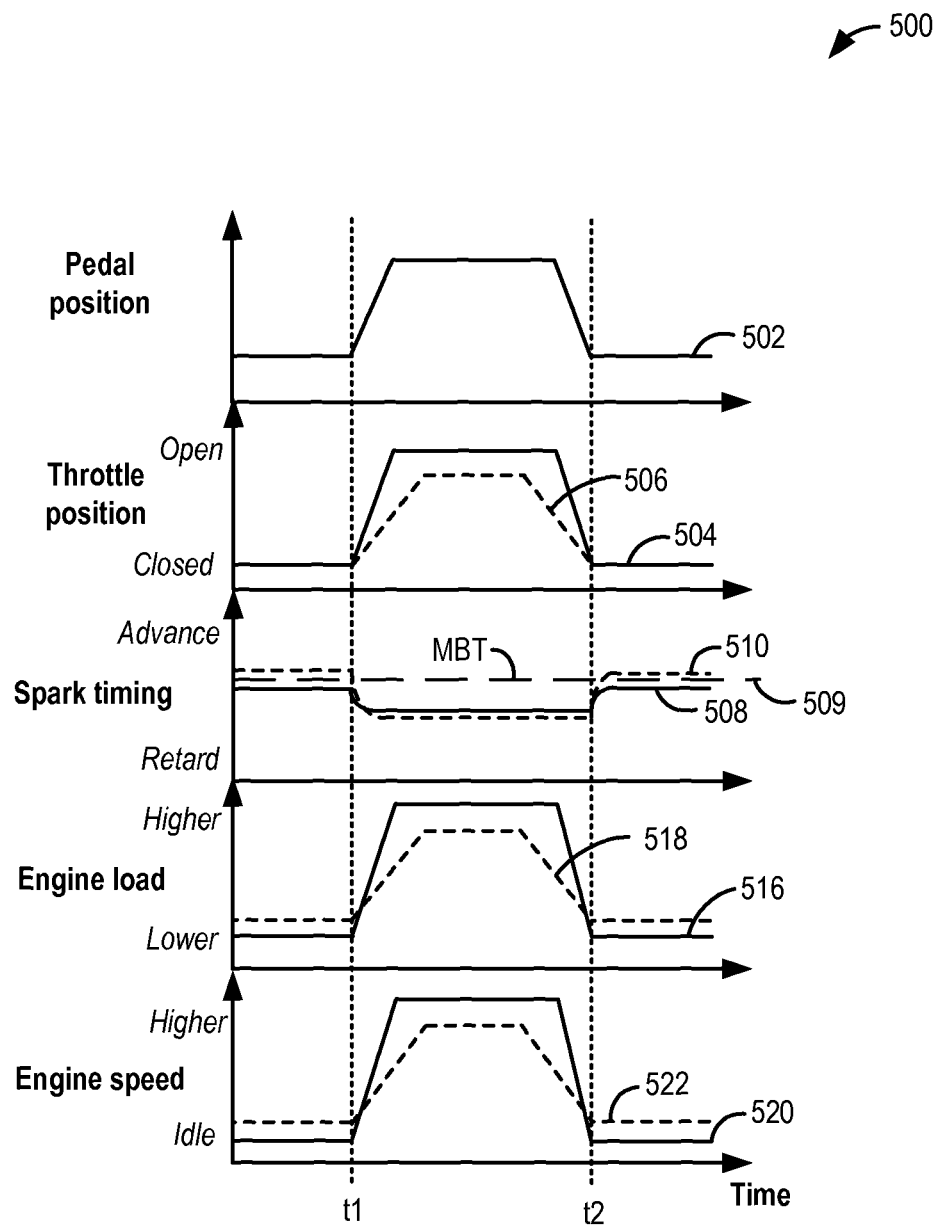
FIG. 5 portrays an example comparison between engine operation in pre-delivery mode and engine operation in post-delivery mode, in accordance with the present disclosure.

FIGS. 3 and 4 demonstrate example variations in engine operation in response to knock and pre-ignition. FIG. 3 depicts an example comparison in engine operation in the pre-delivery calibration (or first mode) with engine operation in response to pre-ignition in the pre-delivery phase (second mode). FIG. 4 portrays an example comparison of engine operation in the post-delivery mode and adjustments to engine parameters in response to pre-ignition in the post-delivery mode. Each of FIGS. 3 and 4 may be for boosted engines similar to example engine 10 of FIG. 1.

Turning now to FIG. 3, it shows map 300 that depicts knock sensor output at plot 302, spark timing at plot 304, AFR at plot 308, allowable boost level at plot 310, allowable engine load at 314, indication of pre-ignition at plot 318, indication of spark plug fouling at plot 320, and indication of engine operating mode at plot 322. Engine operating mode, in this example, includes two options of the pre-delivery mode and the post-delivery mode. As such, the second mode of routine 200 is an adjusted pre-delivery mode occurring in the pre-delivery phase of the vehicle. Likewise, the fourth mode of routine 200 is an adjusted post-delivery mode occurring in the post-delivery phase of the vehicle. Line 301 represents a threshold limit for indicating pre-ignition, line 303 is the threshold limit for indicating knock, and line 305 corresponds to AFR being at stoichiometry. All the above are plotted against time on the x-axis with time increasing from left to right of the x-axis.

It will be noted that a higher allowable boost level indicates a lower amount of boost limit. In other words, a higher allowable boost level may be a less restricted boost pressure. Similarly, a higher allowable engine load indicates a smaller amount of engine load limiting or a less restricted engine load. Further, when a decrease in allowable engine load is observed, it indicates that an amount of engine load limiting has increased. It will also be noted that boost may be controlled to regulate engine load. For example, engine load may be learned by dividing the engine air charge by a maximum air charge. Thus, limiting boost can limit engine load by limiting airflow (and air charge) into the engine cylinders by adjusting one of an opening of the wastegate, a degree of opening of the intake throttle, and by adjusting variable cam timing.

Prior to time t1, the example engine may be operating in the first mode or in pre-delivery calibration (plot 322). Further, the vehicle may be at non-idle conditions. Therefore, the allowable engine load and boost levels may be limited to a lower extent (e.g. by a first amount of engine load limiting) and are each depicted at a moderately high level. Further, AFR may be leaner than stoichiometry and spark timing may be retarded relative to borderline spark (second setting in post-delivery mode) at higher torque outputs (non-idling conditions). During engine idling conditions, spark timing may be advanced relative to MBT in the pre-delivery calibration. As explained earlier, these settings may be the first settings for each of these parameters and may be used to reduce spark plug deposits and reduce a likelihood of pre-ignition degradation (e.g. by limiting boost and engine load). For example, the AFR may be set at its first setting of leaner than stoichiometric based on an anticipated degree of spark plug fouling.

As such, during the pre-delivery phase, the engine may be operated with enleanment of air/fuel ratio responsive to fouling of the spark plug, the enleanment based on a degree of the fouling.

Prior to t1, there is no indication of knock or pre-ignition. At t1, knock may be detected via the output of the knock sensor being higher than threshold 303. In response to knock in this pre-delivery phase (and in the first mode), spark timing may be retarded at t1. Further, as knock subsides between t1 and t2, engine operation may continue with spark timing at its retarded timing (plot 304). As such, other parameters are maintained at their earlier levels and only spark may be retarded in response to knock.

At t2, an indication of pre-ignition may be received via knock sensor output being higher than threshold 301. Pre-ignition is therefore signaled at t2 by plot 318. In response to this indication of pre-ignition, combustion may be enriched at t2 such that AFR is significantly richer than stoichiometry. For example, fuel delivered to the affected cylinder(s) may be substantially increased at t2 and may be maintained at this increased level. In an alternate example, to reduce a likelihood of spark plug fouling during rich combustion, the increase in injected fuel quantity may be tapered off gradually between t2 and t3. Further, the allowable engine load may be reduced by applying a higher amount of engine load limiting such that the engine provides a reduced torque relative to demanded torque. Furthermore, allowable engine boost level may also be reduced relative to boost levels prior to t2. As explained earlier, boost levels may be limited by adjusting a position of the wastegate. For example, the wastegate may be opened from a more closed position to reduce boost. Further still, spark timing may not be adjusted in response to pre-ignition in the pre-delivery phase (plot 304). The timing may be maintained at its first setting (at higher torque demands during non-idle conditions) if detonation has not yet occurred or at its retarded setting, as shown, in response to knock (retarded at t1).

At t3, an indication of spark plug fouling conditions (plot 320) is provided. In response to this indication, AFR may be enleaned such that a leaner than stoichiometry ratio prevails in the affected cylinder(s). Herein, the amount of fuel delivered to the affected cylinder(s) may be substantially reduced until AFR decreases below stoichiometry. While AFR is enleaned in response to spark plug fouling at t3, the limiting on engine load and boost may be retained at the same levels as between t2 and t3 to ensure that pre-ignition conditions subside. Once spark plug fouling conditions are eased, at t4, AFR may be re-adjusted to its first setting before t2.

The adjustments to the allowable boost levels and allowable engine loads in response to pre-ignition at t2 may be retained even after pre-ignition subsides, at t4. Therefore, beyond t4, the engine may operate with a higher amount of limiting on boost pressure and engine loads even after pre-ignition is mitigated. In an alternate example, shown by the dashed lines 312 and 316, allowable boost and allowable engine loads may be returned at t4 to their levels before t2. Thus, an example system for a vehicle may comprise a boosted engine including a cylinder, a spark plug within the cylinder, a knock sensor, and a control system with computer-readable instructions stored on non-transitory memory for, during a pre-delivery phase, operating the boosted engine with a leaner than stoichiometric air/fuel ratio to reduce spark plug fouling; and in response to indication of a pre-ignition event by the knock sensor, operating the boosted engine with a richer than stoichiometric air/fuel ratio. The control system may include further instructions for enleaning the richer than stoichiometric air/fuel ratio responsive to spark plug fouling. The control system may comprise further instructions for operating the boosted engine with reduced boost in the pre-delivery phase, and in response to the indication of the pre-ignition event, further limiting the reduced boost. As such, the boosted engine may be operated with a spark timing that is advanced relative to maximum brake torque (MBT) timing when the engine is idling (not shown in map 300). Further, the control system may retard the spark timing relative to borderline timing when the engine is not idling in the pre-delivery phase.

FIG. 4, as mentioned earlier, presents an example comparison of engine operation in the post-delivery mode and adjustments to engine parameters in response to pre-ignition in the post-delivery mode. Map 400 of FIG. 4 depicts knock sensor output at plot 402, spark timing at plot 404, AFR at plot 408, allowable boost level at plot 410, allowable engine load at 414, indication of pre-ignition at plot 418, and mode of engine operation at 420. Additionally, line 401 represents a threshold limit for indicating pre-ignition, line 403 is the threshold limit for indicating knock, and line 305 corresponds to AFR being at stoichiometry. All the above are plotted against time on the x-axis with time increasing from left to right along the x-axis. It will be noted that a higher allowable boost level indicates a lower amount of boost limiting. Similarly, a higher allowable engine load indicates a smaller amount of engine load limiting. In other words, a higher allowable engine load and a higher allowable boost indicate lower restrictions on each of engine load and boost. Further, when a decrease in allowable engine load (and/or allowable boost) is observed in plot 414 (or plot 410), it indicates that an amount of engine limiting (or limiting of boost) has increased.

It will be observed that map 400 also includes plots of variations in AFR (308), spark timing (304), allowable boost (310), and allowable engine load (314) from map 300. These plots are indicated as small dashed lines. By including these plots, a comparison between first settings in pre-delivery calibration (first mode), adjusted first settings in response to pre-ignition (second mode), post-delivery calibration (post-delivery mode), and adjustments to post-delivery calibration in response to pre-ignition (fourth mode) may be appreciated. Thus, additional comparisons between engine operation in the pre-delivery phase and the post-delivery phase may be made. Further, the distinct responses to pre-ignition based on whether the vehicle is in pre-delivery phase or post-delivery phase will be demonstrated.

Prior to t1, the engine may be operating in post-delivery mode with a post-delivery calibration as shown by plot 420. Further, the vehicle may be at non-idle conditions wherein the torque output may be higher. Accordingly, spark timing may be set to borderline spark (BDL), and AFR may be substantially at stoichiometry. Further, the post-delivery mode may include no limiting on either engine load or boost. Therefore, allowable engine loads and allowable boost may be greater than those in the first mode (dashed lines 310 and 314). Further, each of the above engine parameters may be set to their respective second settings.

At t1, knock may be detected via the output of the knock sensor being higher than threshold 403. As such, threshold 403 for knock in post-delivery mode may be different from threshold 303 in FIG. 3 for indicating knock in pre-delivery mode. In one example, threshold 403 may be higher than threshold 303. In another example, the two threshold limits for knock in pre-delivery mode and post-delivery mode may be similar.

Upon detection of knock, spark timing may be retarded (as in map 300) as shown in plot 404 at t1. Further, it will be noted that spark timing may be retarded to a smaller extent in the post-delivery mode relative to the spark retard in the pre-delivery mode (plot 304). That is, an amount of spark retard applied in response to knock in the post-delivery mode may be smaller than a corresponding spark retard applied in response to knock in the pre-delivery mode.

Further, once knock reduces (between t1 and t2), the retarded spark timing may be adjusted at t2. In one example, spark timing may be restored to the timing before knock mitigation (as in, timing before t1). In another example, spark timing may be advanced but not to its original setting. In yet another example, a different spark timing may be chosen based on borderline spark for given engine conditions. As observed, plot 304 demonstrates that spark timing may not be restored (but maintained in its retarded position) in the pre-delivery mode even after knock subsides.

At t3, an indication of pre-ignition may be received when knock sensor output is higher than threshold 401. As such, threshold 401 for indicating pre-ignition in the post-delivery mode may be distinct from threshold 301 of map 300 for indicating pre-ignition in the pre-delivery mode. In one example, threshold 401 may be higher than threshold 301. In another example, threshold 401 may be the same as threshold 301.

Once a pre-ignition event is indicated at t3 by plot 418, combustion may be enriched as shown by plot 408 and AFR may be richer than stoichiometry. As such, the richness of combustion in response to pre-ignition in the post-delivery phase may be smaller (initially) than the enrichment provided in the pre-delivery phase (as shown by dashed plot 308). The adjustment to the second setting of AFR in the post-delivery phase responsive to pre-ignition may be smaller than the corresponding adjustment to the first setting of AFR in the pre-delivery phase responsive to pre-ignition. In other words, in response to pre-ignition in the post-delivery phase, the total fuel amount injected into the engine cylinders may be increased by a smaller amount of fuel (e.g., to cause a change in AFR from substantially a stoichiometric ratio to relatively richer than stoichiometry). In comparison, the total amount of fuel injected into the engine cylinders in response to pre-ignition in the pre-delivery phase may be increased by a larger amount (e.g., to cause a change in AFR from leaner than stoichiometry to significantly richer than stoichiometry). As such, a more aggressive enrichment may be delivered in the pre-delivery phase to mitigate pre-ignition while a less aggressive enrichment may be supplied in the post-delivery phase to address pre-ignition. In the post-delivery mode, a smaller increase in the amount of fuel injected in response to pre-ignition may reduce adverse effects on fuel economy of the vehicle. Further, if AFR becomes richer than RBT, additional enrichment in response to pre-ignition may typically cause a reduction in torque. Accordingly, in the post-delivery mode, a smaller amount of enrichment may be provided to control pre-ignition.

In the pre-delivery phase, though, the enrichment provided may also be based on reducing spark plug fouling. As shown by dashed plot 308 at t4 on map 400, AFR in the pre-delivery phase may be enleaned in response to spark plug fouling. Therefore, the AFR in the post-delivery mode in response to pre-ignition may be richer than the AFR in the pre-delivery phase between t4 and t5. For example, if spark plug fouling is observed after one enriched combustion event (responsive to pre-ignition) in the pre-delivery mode, the AFR may be made leaner. Thus, the richer than stoichiometric AFR in response to pre-ignition in the pre-delivery phase may be enleaned by the controller if spark plug fouling conditions are indicated.

Therefore, during the pre-delivery phase of the vehicle, a method for a boosted engine may include operating the engine with an air/fuel ratio to reduce spark plug fouling, wherein a richness of the air/fuel ratio may be based on a degree of spark plug fouling. The richness of the air/fuel ratio may be adjusted in response to pre-ignition. Further, during the post-delivery phase of the vehicle, the method may include modifying the richness of the air/fuel ratio in response to pre-ignition with a different gain relative to that in the pre-delivery phase. Furthermore, during the pre-delivery phase, the richness of the air/fuel ratio when modified in response to pre-ignition includes enriching with a first, larger amount of fuel. Further still, during the post-delivery phase, the richness of the air/fuel ratio when modified in response to pre-ignition includes enriching with a second, smaller amount of fuel. As such, in the pre-delivery phase, the richness of the air/fuel ratio responsive to pre-ignition may be further readjusted (e.g. enleaned) to a leaner than stoichiometric air/fuel ratio in response to spark plug fouling conditions.

In response to the pre-ignition event at t3 and in addition to the enrichment of combustion, spark timing may be adjusted at t3. Depending on engine operating conditions during the enrichment in response to pre-ignition, and the amount of richness provided, spark timing may be advanced as shown. Operating the engine at conditions richer than RBT may reduce torque output. Accordingly, spark timing may be advanced 0 to 4 degrees to recover torque. In the pre-delivery phase, though, spark timing may not be adjusted in response to pre-ignition (plot 304).

Furthermore, the allowable boost and allowable engine loads may be limited in response to pre-ignition at t3. In response to the limiting, each of allowable boost and allowable engine load decrease at t3. However, the amount of engine load limiting applied in the post-delivery phase may be lower than a corresponding load limiting applied in the pre-delivery phase in response to pre-ignition. To elaborate, the allowable engine loads in response to pre-ignition in the post-delivery mode may be higher (plot 414) than the allowable engine loads in response to pre-ignition in the pre-delivery mode (plot 314). Similarly, boost may be limited to a smaller extent in the post-delivery mode than a corresponding limiting in the pre-delivery mode. To elaborate, allowable boost in response to pre-ignition in the post-delivery mode (plot 410) may be higher than the allowable boost in response to pre-ignition in the pre-delivery mode (plot 310).

At t5, the pre-ignition event (and/or conditions) may be mitigated, and in response to the reduction of pre-ignition conditions, spark timing may be restored, AFR may be returned to at or about stoichiometric, and allowable boost and allowable engine load may be returned to their original levels, e.g. those at t2. In comparison, allowable engine load and allowable engine boost in the pre-delivery mode may continue to be limited even after pre-ignition subsides.

It will be appreciated that in the post-delivery mode, engine load limiting may stay active until a threshold number of miles (T_M) is exceeded without pre-ignition. Once the threshold number of miles, T_M, is surpassed without an occurrence or recurrence of pre-ignition, engine load limiting may be removed. In another example, engine load limiting may be removed after a threshold number of combustion events (T_C) occur without pre-ignition. As such, engine load limiting may be gradually reduced as miles increase and/or combustion events occur with no further pre-ignition. Thus, engine load may not be clipped for a single pre-ignition event in the post-delivery mode. In the pre-delivery mode, though, clipping (or limiting) of engine load may be maintained even after pre-ignition events or conditions subside.

Turning now to FIG. 5, it depicts map 500 illustrating a comparison between engine calibration in the pre-delivery phase and engine calibration in the post-delivery phase. As such, the comparison depicts engine responses to a sudden increase in torque demand when in the pre-delivery calibration and in the post-delivery calibration. Map 500 depicts pedal position (accelerator position) at plot 502, throttle position in the post-delivery phase at 504, throttle position in the pre-delivery phase at 506, spark timing in the post-delivery phase at plot 508, spark timing in the pre-delivery phase at plot 510, engine load in the post-delivery phase at plot at plot 516, engine load in the pre-delivery phase at 518, allowable engine speed in the post-delivery phase at plot 520, and allowable engine speed in the pre-delivery phase at plot 522. It will be observed that pre-delivery engine parameter variations are depicted by dashed lines. Line 509 represents maximum brake torque (MBT) timing for spark. All the above are plotted against time on the x-axis with time increasing from left to right along the x-axis.

Prior to t1, the engine may be operating at idle as shown by plot 520 for engine speed. The pre-delivery calibration aims to reduce spark plug fouling in the newly manufactured engine. Accordingly, engine load at idle conditions may be increased (relative to the post-delivery calibration) as shown by plot 518 to increase in-cylinder temperatures enabling the burning off of deposits on the spark plug. In comparison, engine load in the post-delivery calibration during engine idle may be lower (plot 516). Consequently, engine speed during idling conditions prior to t1 in the pre-delivery calibration (plot 522) may be higher than the corresponding engine speed in the post-delivery calibration. Prior to t1, the pedal may be released (plot 502) and the throttle (plots 504 and 506) may be at a fully closed/mostly closed position. Further, spark timing at engine idle may be retarded from MBT in the post-delivery phase (plot 508) to enable catalyst heating (if at engine cold start) and/or to maintain a torque reserve for fast load rejection during idle speed control. Spark timing in the pre-delivery mode at idling conditions may be advanced from MBT (as shown by plot 510) to increase heat transfer to the spark plugs.

At t1, a tip-in event may occur wherein a vehicle operator may depress the accelerator significantly such that there is a large increase in pedal position (plot 502) and a sharp rise in engine speed.

In response to the change in position of the pedal, the throttle may be opened to enable airflow into the engine. As will be noted, in the post-delivery calibration, the throttle may be opened to a larger extent (plot 504) as compared to the opening of the throttle in the pre-delivery calibration (plot 506). The opening of the throttle may be limited in the pre-delivery calibration to limit allowable engine load and torque output. The pre-delivery calibration may apply a higher amount of load limiting on the engine to reduce occurrence of pre-ignition and may limit engine load by limiting airflow, e.g. by limiting throttle opening. Airflow may also be limited by adjusting (e.g. limiting) boost levels by modifying a position of the wastegate. Thus, in the pre-delivery phase, in order to reduce a likelihood of pre-ignition, the throttle may not open to its fullest extent. The post-delivery mode may not limit airflow or allowable engine load (and boost) except in response to pre-ignition. Therefore, the throttle may be opened to be its fullest extent in response to the tip-in event in the post-delivery mode.

As will be observed from plots 516 and 518, a higher engine load may be allowed in the post-delivery phase (plot 516) while a lower engine load may be allowed in the pre-delivery phase (plot 518). Similarly, engine speed in the post-delivery phase (plot 520) may increase to a higher extent than that in the pre-delivery phase (plot 522). As explained earlier, the likelihood of pre-ignition may be reduced by limiting engine loads (and engine speeds) in the pre-delivery phase. The post-delivery calibration only limits engine load in response to pre-ignition.

Further, at t1, in response to the tip-in event and higher torque demand, spark timing in the post-delivery phase (plot 508) may be at borderline spark. In comparison, spark timing in the pre-delivery phase (plot 510) may be retarded from borderline spark to reduce a likelihood of detonation.

At t2, the tip-in event may end and engine operation may be returned to idle. Accordingly, the different engine parameters may be returned to their respective levels prior to t1.

In this way, an engine in a newly manufactured vehicle may be controlled to address spark plug fouling as well as pre-ignition events. By adjusting various engine parameters to different settings in response to different vehicle modes, deposits on the spark plug may be diminished and pre-ignition conditions may be reduced. Thus, a pre-delivery calibration may be set to lessen spark plug fouling. The pre-delivery calibration may be adjusted in response to pre-ignition, thereby reducing engine degradation due to pre-ignition. Further, adjustments to the engine parameters in response to pre-ignition may be more aggressive in the pre-delivery phase than after the vehicle is delivered to a dealership (or to a customer). By controlling the engine parameters to reduce spark plug fouling and pre-ignition simultaneously, engine degradation may be reduced. Furthermore, the post-delivery calibration may enhance engine performance and improve emissions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a pre-delivery phase of a vehicle,
operating an engine with a first setting for air/fuel ratio to reduce spark plug fouling; and
adjusting the first setting for air/fuel ratio responsive to pre-ignition, the pre-delivery phase including at least one of a duration before deactivation of a pre-delivery calibration, a lower than threshold amount of fuel consumption, a lower than threshold number of combustion events, and a lower than threshold vehicle mileage.

2. The method of claim 1, wherein the first setting for air/fuel ratio is leaner than stoichiometry, and wherein the adjusting responsive to pre-ignition includes adjusting the air/fuel ratio to substantially richer than stoichiometry.

3. The method of claim 2, further comprising modifying the adjusted air/fuel ratio in response to spark plug fouling, the modifying including an enleaning of the adjusted air/fuel ratio.

4. The method of claim 1, further comprising operating the engine during the pre-delivery phase with a first setting for engine load, and adjusting the first setting for engine load in response to pre-ignition.

5. The method of claim 4, wherein the first setting for engine load includes limiting the engine load by a first amount, and wherein the adjusting responsive to pre-ignition includes limiting the engine load by a second amount, the second amount being greater than the first amount.

6. The method of claim 5, further comprising retaining the limiting of engine load by the second amount after pre-ignition subsides.

7. The method of claim 6, wherein engine load is limited by limiting airflow into one or more cylinders of the engine.

8. The method of claim 7, wherein limiting airflow includes one or more of reducing an opening of an intake throttle, increasing an opening of a turbocharger wastegate, and adjusting cylinder valve timing to reduce an intake aircharge.

9. The method of claim 4, further comprising operating the engine with a spark timing that is advanced relative to maximum brake torque (MBT) timing during engine idling conditions.

* * * * *